United States Patent [19]
Esclar et al.

[11] Patent Number: 5,788,119
[45] Date of Patent: Aug. 4, 1998

[54] DEVICE FOR STORING A LIQUID OR PASTY PRODUCT AND FOR DISPENSING A GIVEN QUANTITY OF THE PRODUCT

[75] Inventors: Dominique Esclar, Herpy L'Arlesienne; Franck Leitman, Tremblay En France; Michel Gaubert, Goussainville, all of France

[73] Assignee: L'Oreal, Paris, France

[21] Appl. No.: 683,729

[22] Filed: Jul. 18, 1996

[30] Foreign Application Priority Data

Jul. 20, 1995 [FR] France ................... 95 08797

[51] Int. Cl.$^6$ ........................................ B67D 5/08
[52] U.S. Cl. ........................ 222/58; 222/61; 222/77; 222/183
[58] Field of Search ........................ 222/58, 61, 77, 222/160, 183, 396, 399, 464.1, 464.3

[56] References Cited

U.S. PATENT DOCUMENTS

| | | |
|---|---|---|
| 2,549,207 | 4/1951 | Kestenbaum ................... 222/77 |
| 3,843,020 | 10/1974 | Bardeau et al. ................ 222/58 |
| 4,013,194 | 3/1977 | Moscarini . | 
| 5,007,560 | 4/1991 | Sassak . |

Primary Examiner—Philippe Derakshani
Attorney, Agent, or Firm—Oliff & Berridge, P.L.C.

[57] ABSTRACT

A device for storing a liquid or pasty product and for dispensing a given quantity of the product includes a container that contains the product. A stopper is disposed at an upper end of the container. A dip tube extends through a channel of the stopper and into the container. A sealed enclosure receives the container such that the container can be subjected to a pressure higher than a pressure outside of the enclosure. A weighing element of the enclosure measures the weight of the container when the container is received in the enclosure. A controller controls a mechanism for pressurizing the enclosure by comparing a change in weight of the container with a set value that corresponds to a predetermined quantity of product to be ejected from the container, and interrupting pressurization of the container when the change in weight of the container has reached the set value.

15 Claims, 2 Drawing Sheets

DEVICE FOR STORING A LIQUID OR PASTY PRODUCT AND FOR DISPENSING A GIVEN QUANTITY OF THE PRODUCT

BACKGROUND OF THE INVENTION

The present invention relates to a device for storing a liquid or pasty product and dispensing a given quantity of the product.

A conventional method of storing products away from air and removing certain quantities sporadically, for example in a laboratory, consists of storing the products in sealed containers and, whenever necessary, opening one of the containers for removal of the product using a sterile pipette for example.

This method has the drawback of being awkward and not ensuring proper conservation of the products since, although the pipette is sterile, opening the container places the product in contact with the ambient air, which may contaminate it.

To avoid this drawback, storage and removal devices having a sealed enclosure able to receive a container containing a product and a plurality of such containers, sized accordingly, and each containing a product to be stored, have been proposed.

Each enclosure is open at its upper part where it has a stopper traversed by a dip tube. The dip tube dips into the product and terminates outside the container and the enclosure.

An inside of the container also communicates with an inside of the enclosure through an air passageway located in the container above the product level.

When the inside of the container is pressurized, the product contained in the container is subjected to this pressure and escapes via the dip tube.

Such a storage and removal device fulfills product storage requirements since removal of a product does not cause the stored product to contact the outside. As the only material brought into the vicinity of the product is compressed air injected into the enclosure, the sterility of the air is easily ensured.

However, this known removal device does not afford great reliability as to the quantity of product removed from the container.

SUMMARY OF THE INVENTION

It is an object of the present invention to provide an apparatus and method of solving the problems identified above.

The present invention is directed to a device for storing a liquid or pasty product and dispensing a given quantity of this product, which includes at least one container to contain the product that is open at an upper part. A stopper is provided for closing the container. A dip tube passes through the stopper, dips into the product, and terminates outside of the container. A sealed enclosure is able to receive the container and subject it to a pressure higher than the pressure prevailing outside of the enclosure. A bottom of the enclosure has a weighing element which measures the weight of the container when the container is placed in the sealed enclosure.

It will thus be understood that, by measuring the weight of the container, the quantity of product expelled therefrom can be determined by placing the sealed enclosure under pressure.

In this way, one knows precisely, and at any moment, what quantity of product has been removed from the container.

In an advantageous embodiment of the invention, the weighing element is connected to a control system that controls a means of pressurizing the sealed enclosure. The control system compares the change in weight of the container and a set value corresponding to a predetermined quantity of product to be removed from the container. The control system interrupts pressurization of the sealed enclosure when the weight change of the container has reached this set value.

In this embodiment, removal of a given quantity of product is effected automatically, which prevents too much product from being removed relative to the quantity strictly desired.

In addition, this automatic operation is particularly suitable for integrating the device according to the invention into an automated product dispensing system that includes a plurality of containers. Each container is closed by a stopper. A sealed enclosure is common to all of the containers. A manipulating arm is able to grasp a container containing a desired product, insert it into the enclosure for the product removal operation and grip it in the enclosure to restore it to its original location.

To facilitate insertion of the container into the sealed enclosure, particularly when this insertion is effected automatically by a manipulating arm, in an embodiment of the invention, the sealed enclosure is open at its upper part. A bottom of the sealed enclosure is joined to a lifting means, such as a pneumatic jack, able to raise the bottom of the enclosure to the vicinity of the opening of the latter.

Thus, in the standby position, the bottom of the sealed enclosure is located essentially at the level of the opening of the sealed enclosure, and thus can receive a container simply set down by a user or by a manipulating arm.

The container is inserted into the sealed enclosure by lowering the bottom of said sealed enclosure by the lifting means.

When the removal operation is complete, the container is extracted from the sealed enclosure by raising the bottom of said sealed enclosure.

Thus, the container can be grasped once again by the user or by a manipulating arm.

In an embodiment of the invention, the stopper is mounted on the container with axial play such that the stopper is free to separate slightly from the container. An air passage is thus created between the inside and outside of the container.

Advantageously, the dip tube rests on the bottom of the container when the stopper closes the container, and moves away from the bottom of the container when the stopper is removed from the container.

When the stopper closes the container, the seal of the container is ensured by the fact that the dip tube, resting on the bottom of the container, is thus plugged.

When the stopper is removed from the container, an air passage is created between the opening of the container and the stopper, the dip tube also being released.

In an embodiment of the invention, the sealed enclosure is open at its upper part. The stopper is sized to close the sealed enclosure when it is placed on the container, the container being inserted into the sealed enclosure.

This embodiment has the advantage of considerably simplifying the manner in which the sealed enclosure is closed, thereby facilitating automation of product removal.

Advantageously, in this embodiment, the sealed enclosure is sized so that the stopper moves away from the container by resting on the sealed enclosure when the container rests on the bottom of said sealed enclosure.

This embodiment ensures not only closure of the sealed enclosure, but also automatic opening of the container merely by inserting the container into the sealed enclosure.

BRIEF DESCRIPTION OF THE DRAWINGS

For better understanding of the invention, one embodiment provided as a nonlimiting example will now be described, with reference to the attached drawing wherein.

DETAILED DESCRIPTION OF PREFERRED EMBODIMENTS

Figure 1:
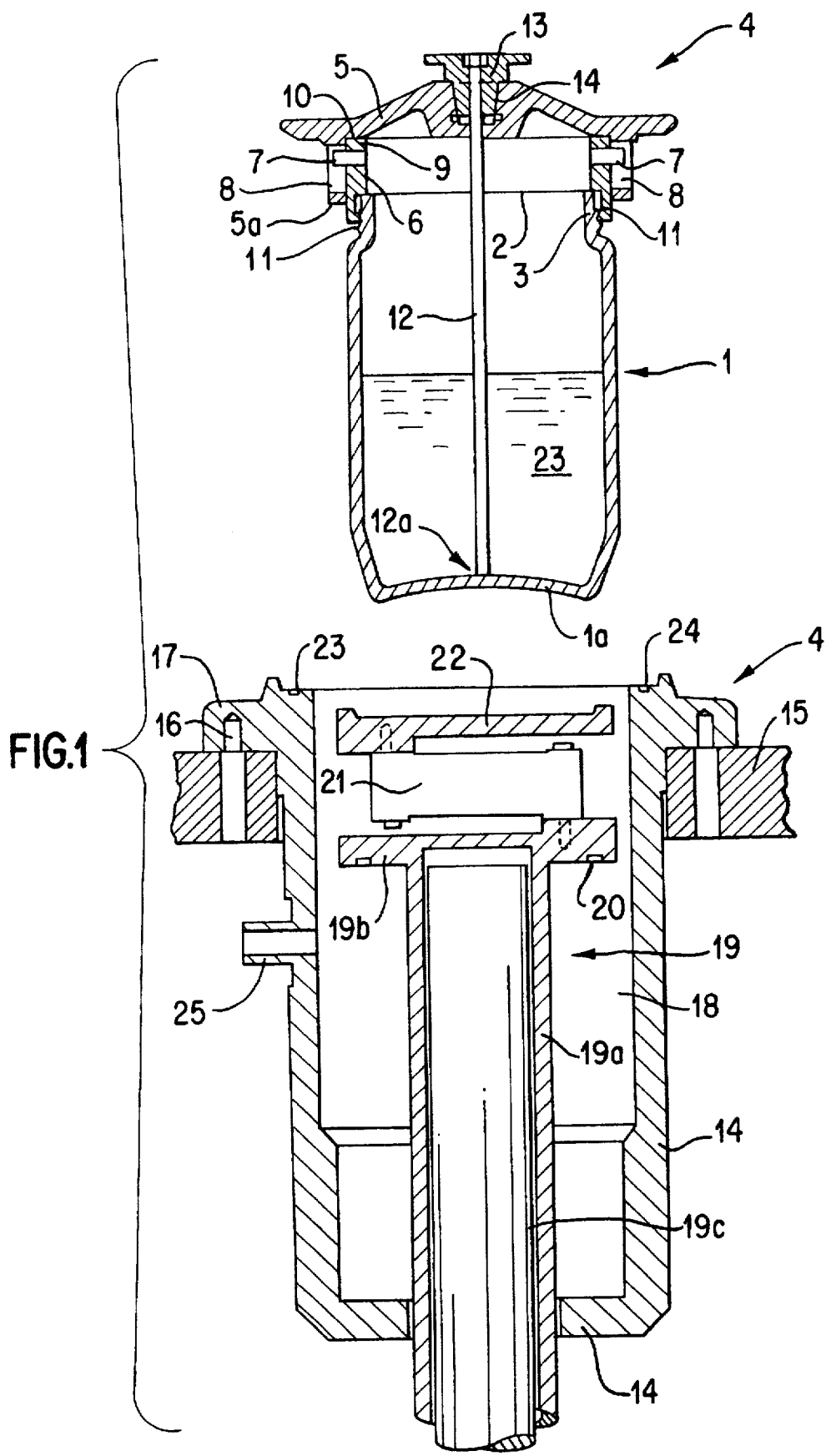
FIG. 1 is an axial sectional view of a device according to the invention.

The device shown in the drawing has a container 1, made of glass, which has an opening 2 at its upper part, delimited by a neck 3.

A stopper 4 is placed on neck 3 of the container to close its opening 2.

Stopper 4 has two parts, namely a lid 5 which covers container 1 and a sleeve 6 fitted around neck 3 of the container.

Lid 5 has a skirt 5a which fits around sleeve 6.

Sleeve 6 has two diametrically opposite stubs 7 directed outward, which penetrate into axial recesses 8 provided in skirt 5a of the lid.

Figure 2:
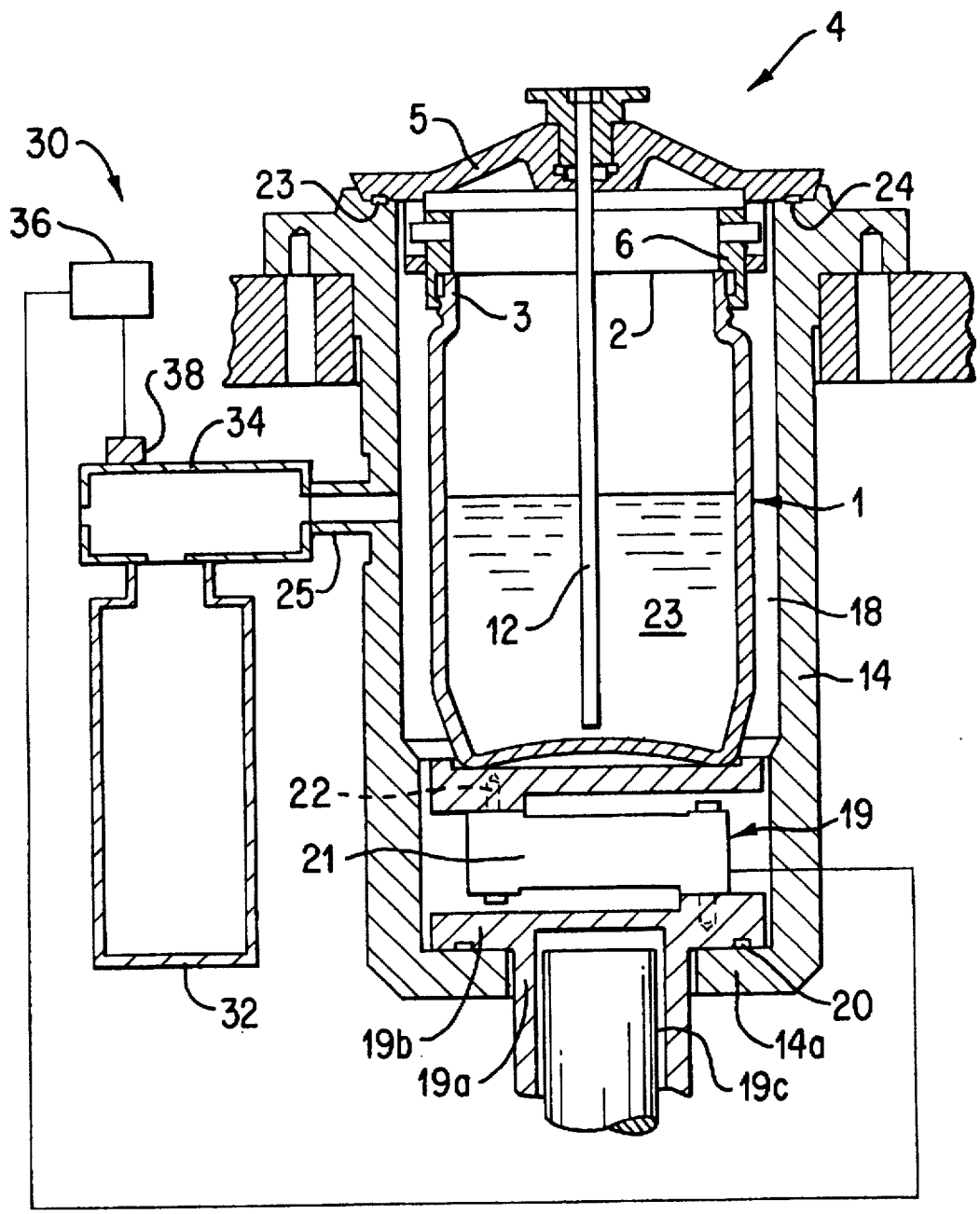
FIG. 2 is a view similar to FIG. 1 with the container inserted into the sealed enclosure.

Lid 5 is thus mounted on sleeve 6 with axial play allowing the lid 5 to move away from the sleeve 6, as shown in FIG. 2.

In the closed position, shown in FIG. 1, the seal of lid 5 is ensured by causing the upper edge 9 of sleeve 6 to contact a corresponding annular supporting surface 10 provided on the lower surface of lid 5, whereby the supporting force between edge 9 and surface 10 results only from the weight of lid 5.

Sleeve 6 is also snapped at its upper part onto neck 3, which has outside ribs 11 for the purpose.

A dip tube 12 passes through stopper 4, with which it is joined through a nipple 13 immobilized in a recess provided in the central part of the upper surface of lid 5.

The height of dip tube 12 is such that the end 12a of the latter rests on the bottom wall 1a of the container when lid 4 is closed, as shown in FIG. 1.

Thus, closure of dip tube 12 is achieved simply by bringing its lower end 12a into contact with the bottom wall of container 1.

Nipple 13 is designed to receive the end of a tube or of an external container (not shown) designed to receive the product removed from container 1.

Sealed enclosure 14 is mounted on a working surface 15 by its upper flange 17 which is attached to said working surface 15 by mounts 16.

Sealed enclosure 14 has an internal cavity 18 provided with a bottom 19 which moves axially under the action of a lifting means such as a pneumatic jack 19c between an upper position and a lowered position.

This bottom 19 has a shaft 19a ending at its upper part with a first plate 19b.

The lower surface of first plate 19b has a recess in which a gasket 20 is accommodated, which provides the seal of enclosure 14 when bottom 19 is in the lowered position, as shown in Figure.

A dynamometric sensor 21 is attached to first plate 19b and itself supports a second plate 22 able to support container 1.

The assembly comprises the two plates 19b and 22, and by dynamometric sensor 21 constitutes a weighing element able to measure the weight of container 1 resting on the bottom 19 of the enclosure continuously.

The device is used as follows.

To remove a given quantity of a liquid product 23 contained in container 1, this quantity being expressed by weight, container 1 is placed on plate 22, with bottom 19 in the upper position as shown in FIG. 1.

Lifting means 19c is then activated to lower bottom 19 into the lowered position, and said bottom 19 brings the container with it inside the enclosure, as shown in FIG. 2.

When the lower surface of first plate 19b is in contact with the lower wall 14a of the enclosure, bottom 19 is in the lowered position and gasket 20 ensures the tightness of the enclosure at its lower part.

Lid 5 of stopper 4 then presses against the upper edge 23 of the enclosure, thus ensuring the tightness of said enclosure at its upper part.

Holding elements (not shown), pneumatically controlled for example, are then activated to lock lid 5 into this position.

FIG. 2 shows that when bottom 19 is in the lowered position, container 1 is separated from lid 5.

More specifically, sleeve 6, which is Joined to neck 3 of the container, descends with the latter into the enclosure, while the descent of lid 5 is limited by the fact that the latter abuts the upper edge 23 of the sealed enclosure.

As a result, a space is created between lid 5 and sleeve 6, made possible by the fact that stubs 7 are free to slide in recesses 8.

This space forms an air passage between the inside of container 1 and cavity 18.

Hence, when compressed air is injected through orifice 25 into cavity 18, the liquid product 23 is subjected to overpressure and escapes the container via dip tube 12.

It may be noted that the walls of container 1 remain in pressure equilibrium in the enclosure such that they can withstand the high pressures necessitated by the high viscosity of product 23.

During this operation, container 1 and liquid product 23 are continuously weighed by weighing element 19b, 21, 22 such that the quantity of product ejected from the container can be determined by calculating the change in weight of the container.

A system 30 controls the quantity of product 23 ejected from the container. The system 30 includes a sterile compressed air reservoir 32 connected to orifice 25 of the enclosure 14 by a valve 34. A controller 36 is connected to an actuator 38 of the valve 34 to control the amount of pressurized air injected into the enclosure 14 via the orifice 25.

The controller 36 is also connected to the dynamometric sensor 21. The controller 36 compares the change in weight of container 1 with a set value corresponding to a predetermined quantity of product to be removed.

When the change in weight of the container reaches this set value, the controller 36 actuates the valve 34 to interrupt the pressurization of sealed enclosure 14 so as to stop expulsion of product 23 via dip tube 12.

Thus, a precise quantity of product can be removed fully automatically.

It may be noted that, since the lid is locked to the upper edge of the enclosure, and since the dip tube is joined to the lid, the weighing element is not subjected to any action of any forces that might interfere with measurement when applied to the lid, due to the presence of a tube or of the end of a container engaged in nipple 13.

Of course, the embodiment just described is not limiting in nature and could receive any desirable modifications without thereby departing from the framework of the invention.

What is claimed is:

1. A device for storing a liquid or pasty product and for dispensing a given quantity of the product, comprising:
   a container for containing the product, the container defining an aperture of an upper part of said container;
   a stopper for closing the container;
   a dip tube extending through the stopper and into the container; and
   a sealed enclosure shaped to receive the container such that the container can be subjected to a pressure higher than a pressure outside of the enclosure, the enclosure having a bottom and a weighing element at the bottom of the enclosure;
   wherein the weighing element measures the weight of the container when the container is in the enclosure.

2. The device according to claim 1, further including a controller for controlling a device for pressurizing the enclosure, the controller being adapted to compare a change in weight of the container with a set value that corresponds to a predetermined quantity of product to be removed from the container, and interrupting pressurization of the enclosure when the change in weight of the container has reached the set value.

3. The device according to claim 1, wherein the enclosure defines an opening at an upper end, and a lifting apparatus communicates with the bottom of the enclosure to raise the bottom of the enclosure toward the opening of the enclosure.

4. The device according to claim 3, wherein the lifting apparatus comprises a pneumatic jack.

5. The device according to claim 1, wherein the container has an axis and the stopper is movable along the axis and is separable from the container to form a passage from an interior to an exterior of the container.

6. The device according to claim 1, wherein the stopper is movable between a sealed position where the stopper seals the container and an unsealed position where the stopper is spaced from the container.

7. A device according to claim 6, wherein an end of the dip tube contacts a base of the container when the stopper is in the sealed position, and the end of the dip tube is spaced from the base of the container when the stopper is in the unsealed position.

8. A device according to claim 1, wherein the enclosure has an opening at an upper end, and the stopper seals the opening when the stopper is on the container and the container is received in the enclosure.

9. A device according to claim 8, wherein the stopper separates from the container when the container approaches the bottom of the enclosure.

10. A method of storing and dispensing a given quantity of a liquid or pasty product, comprising:
    storing a quantity of the product in a container that is contained in a sealed enclosure such that the container can be subjected to a pressure higher than a pressure outside of the enclosure;
    measuring the weight of the container when the container is in the enclosure; and
    ejecting the product from the container by pressurizing the enclosure to a pressure greater than a pressure outside of the enclosure.

11. The method according to claim 10, further including comparing a change in weight of the container with a set value that corresponds to a predetermined quantity of product to be ejected from the container.

12. The method according to claim 11, further including interrupting pressurization of the container when the change in weight of the container has reached the set value.

13. A device for storing and dispensing a given quantity of a liquid or pasty product, comprising:
    means for storing a quantity of the product in a container, the container received in a sealed enclosure such that the container can be subjected to a pressure higher than a pressure outside of the enclosure;
    means for measuring the weight of the container when the container is in the enclosure; and
    means for ejecting the product from the container by pressurizing the container to a pressure greater than a pressure outside of the enclosure.

14. The device according to claim 13, further including means for comparing a change in weight of the container with a set value that corresponds to a predetermined quantity of product to be ejected from the container.

15. The device according to claim 13, further including means for interrupting pressurization of the container when the change in weight of the container has reached the set value.

* * * * *